United States Patent
Donoho

(10) Patent No.: US 7,554,564 B1
(45) Date of Patent: Jun. 30, 2009

(54) METHOD OF UTILIZING A 2-DIMENSIONAL DISPLAY SCREEN AS A 3-DIMENSIONAL MULTI-WAY ROCKER FOR PIVOTING AN IMAGE DISPLAYED THEREON AND FOR REVEALING A HIDDEN PANEL IN RELATION TO THE IMAGE DISPLAYED THEREON

(75) Inventor: Andrew Ward Donoho, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/182,695

(22) Filed: Jul. 30, 2008

(51) Int. Cl.
*G09G 5/00* (2006.01)

(52) U.S. Cl. ..................... 345/650; 345/901

(58) Field of Classification Search ............. 345/650, 345/901
See application file for complete search history.

(56) References Cited

U.S. PATENT DOCUMENTS

| | | | |
|---|---|---|---|
| 5,452,414 A | 9/1995 | Rosendahl et al. | |
| 5,515,486 A | 5/1996 | Amro et al. | |
| 5,588,098 A | 12/1996 | Chen et al. | |
| 5,594,471 A | 1/1997 | Deeran et al. | |
| 5,896,132 A * | 4/1999 | Berstis et al. | 715/786 |
| 5,900,876 A * | 5/1999 | Yagita et al. | 715/776 |
| 5,957,697 A * | 9/1999 | Iggulden et al. | 434/317 |
| 6,020,887 A * | 2/2000 | Loring et al. | 715/786 |
| 6,396,506 B1 | 5/2002 | Hoshino et al. | |
| 7,007,242 B2 | 2/2006 | Suomela et al. | |
| 7,366,995 B2 | 4/2008 | Montague | |
| 2005/0168488 A1* | 8/2005 | Montague | 345/659 |
| 2007/0252832 A1 | 11/2007 | Ratai | |
| 2008/0001924 A1 | 1/2008 | de los Reyes et al. | |
| 2008/0106528 A1 | 5/2008 | Chang et al. | |

FOREIGN PATENT DOCUMENTS

| | | | |
|---|---|---|---|
| JP | 05282255 A | * | 3/1992 |
| JP | 2007-156991 | | 6/2007 |

* cited by examiner

*Primary Examiner*—Jeffery A Brier
(74) *Attorney, Agent, or Firm*—Wenderoth, Lind & Ponack, L.L.P.

(57) ABSTRACT

Utilizing a 2-dimensional display screen as a 3-dimensional multi-way rocker for pivoting an image displayed on the display screen in a 3-dimensional manner. The display screen may include a plurality of predefined and adjustable edge portions, such that each edge portion is designated as a respective rocker edge portion. Further, each respective rocker edge portion can be designated as at least one of a pivot portion and a panel portion. If a rocker edge portion that is a panel portion is utilized, then a hidden panel, including, for example information and/or options related to the image displayed on the display screen, will appear. In addition, if a rocker edge portion that is a pivot portion is utilized, then the image displayed on the display screen will be pivoted around an invisible axis causing a portion of the image (which was once not visible) to appear.

1 Claim, 3 Drawing Sheets

METHOD OF UTILIZING A 2-DIMENSIONAL DISPLAY SCREEN AS A 3-DIMENSIONAL MULTI-WAY ROCKER FOR PIVOTING AN IMAGE DISPLAYED THEREON AND FOR REVEALING A HIDDEN PANEL IN RELATION TO THE IMAGE DISPLAYED THEREON

BACKGROUND OF THE INVENTION

1. Field of the Invention

The present invention relates to utilizing a 2-dimensional display screen as a 3-dimensional multi-way rocker for pivoting an image displayed thereon and for revealing a hidden panel in relation to the image displayed thereon. More specifically, the present invention relates to a method of exploiting a rocker edge portion of a 2-dimensional display screen for (i) pivoting the image displayed on the screen based on a location of the rocker edge portion, and/or (ii) revealing a panel related to the image displayed on the screen.

2. Description of the Related Art

In the past, certain portions of display screens have been designated as portions which (i) provide new functionality in relation to an image displayed on the screen or (ii) provide a new image (e.g., a new window) to appear on the display screen when a user interacts with the certain portions.

However, this above-described functionality still utilizes the display screen as a 2-dimensional display screen, such that the new functionality or the new image displayed thereon appear as if they exist in a 2-dimensional plane.

In order to provide a 3-dimensional environment for image manipulation and extended functionality a method of utilizing a 2-dimensional display screen as a 3-dimensional multiway rocker for pivoting an image thereon in a 3-dimensional manner and for revealing a hidden panel in relation to the image displayed thereon, is described below.

SUMMARY OF THE INVENTION

In view of the above, an embodiment of this invention provides a method of utilizing a 2-dimensional display screen as a 3-dimensional multi-way rocker for pivoting an image displayed on the display screen in a 3-dimensional manner and revealing a hidden panel in relation to the image displayed on the display screen.

An embodiment of this invention may include a display screen having a plurality of invisible or visible predefined and adjustable edge portions, each edge portion being designated as a respective rocker edge portion, and each respective rocker edge portion being designated as at least one of a pivot portion and a panel portion.

Further, an embodiment of this invention may include exploiting a first rocker edge portion of the display screen and revealing a hidden panel in relation to the image displayed on the display screen in response to the exploiting of the first rocker edge portion only if the first rocker edge portion is designated as a panel portion.

In addition, an embodiment of this invention may include exploiting the first rocker edge portion of the display screen and pivoting the image displayed on the display screen in response to the exploiting of the first rocker edge portion, such that the displayed image is pivoted in a 3-dimensional manner based on a location of the first rocker edge portion with respect to the display screen, wherein the pivoting occurs only if the first rocker edge portion is designated as a pivot portion.

Moreover, according to an embodiment of this invention, when the image is pivoted, the pivoting is performed such that (i) a new portion of the image or a new portion associated with the image appears, (ii) the new portion appears in a manner that provides an appearance that the new portion pivots from a third dimension and into the 2-dimensional plane formed by the display screen, and (iii) a previously visible portion of the image pivots in relation to the appearance of the new portion of the displayed image or associated with the displayed image.

Also, according to an embodiment of this invention, when the image displayed on the display screen is pivoted, an axis, around which the image displayed on the display screen rotates, extends in a direction relative to the location of the first rocker edge portion such that the new portion of the displayed image or associated with the displayed image is closer to the first rocker edge portion than the previously visible portion of the image.

Furthermore, additional embodiments of the present invention can be directed to a system utilizing the method of utilizing the 2-dimensional display screen as a 3-dimensional multi-way rocker for pivoting an image displayed on the display screen in a 3-dimensional manner, the system could be, for example, a video conferencing system, a computer system, or an entertainment system. In addition, the present invention can also be implemented as a program causing a computer to execute the above-described steps. The program can be distributed via a computer-readable storage medium such as a CD-ROM.

Additional features and advantages are described herein, and will be apparent from, the following Detailed Description and the figures.

DETAILED DESCRIPTION OF THE INVENTION

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention.

Figure 1:
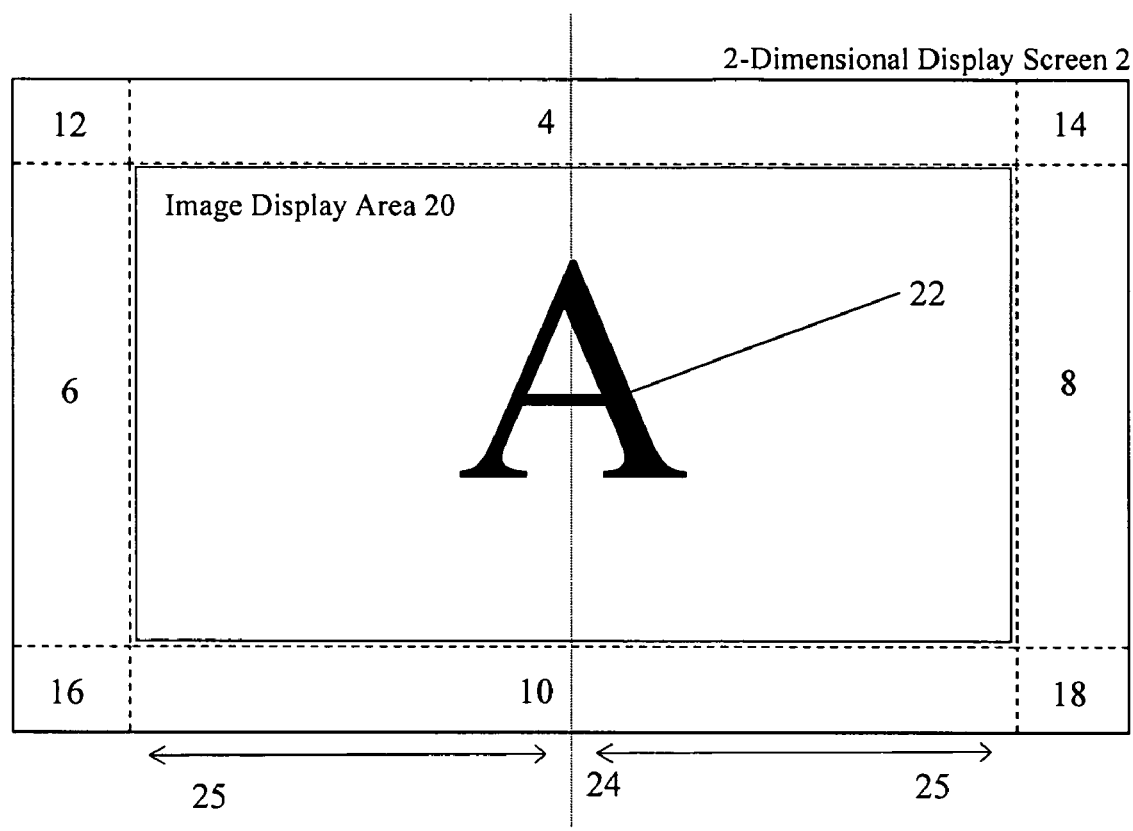
FIG. 1 illustrates an image displayed on a 2-dimensional display screen according to an embodiment of the invention.
Figure 2:
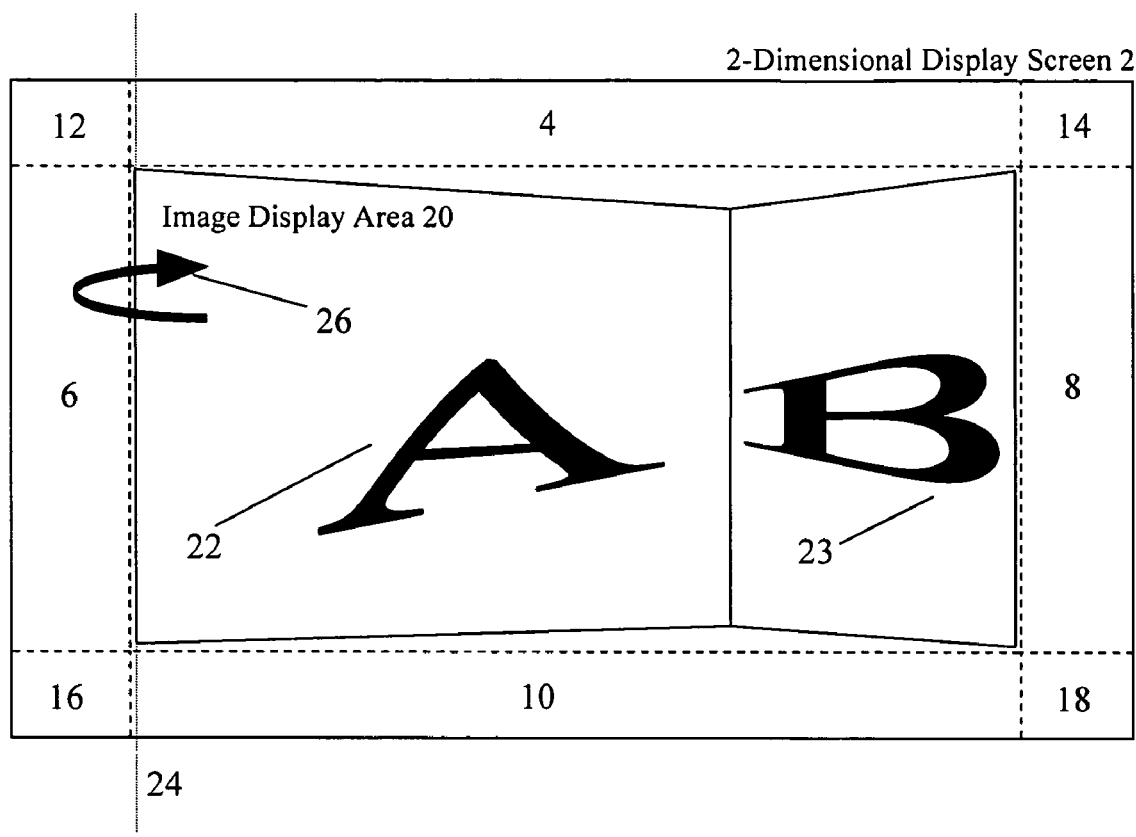
FIG. 2 illustrates an image pivoting in a 3-dimensional manner on the 2-dimensional display screen according to an embodiment of the invention.
Figure 3:
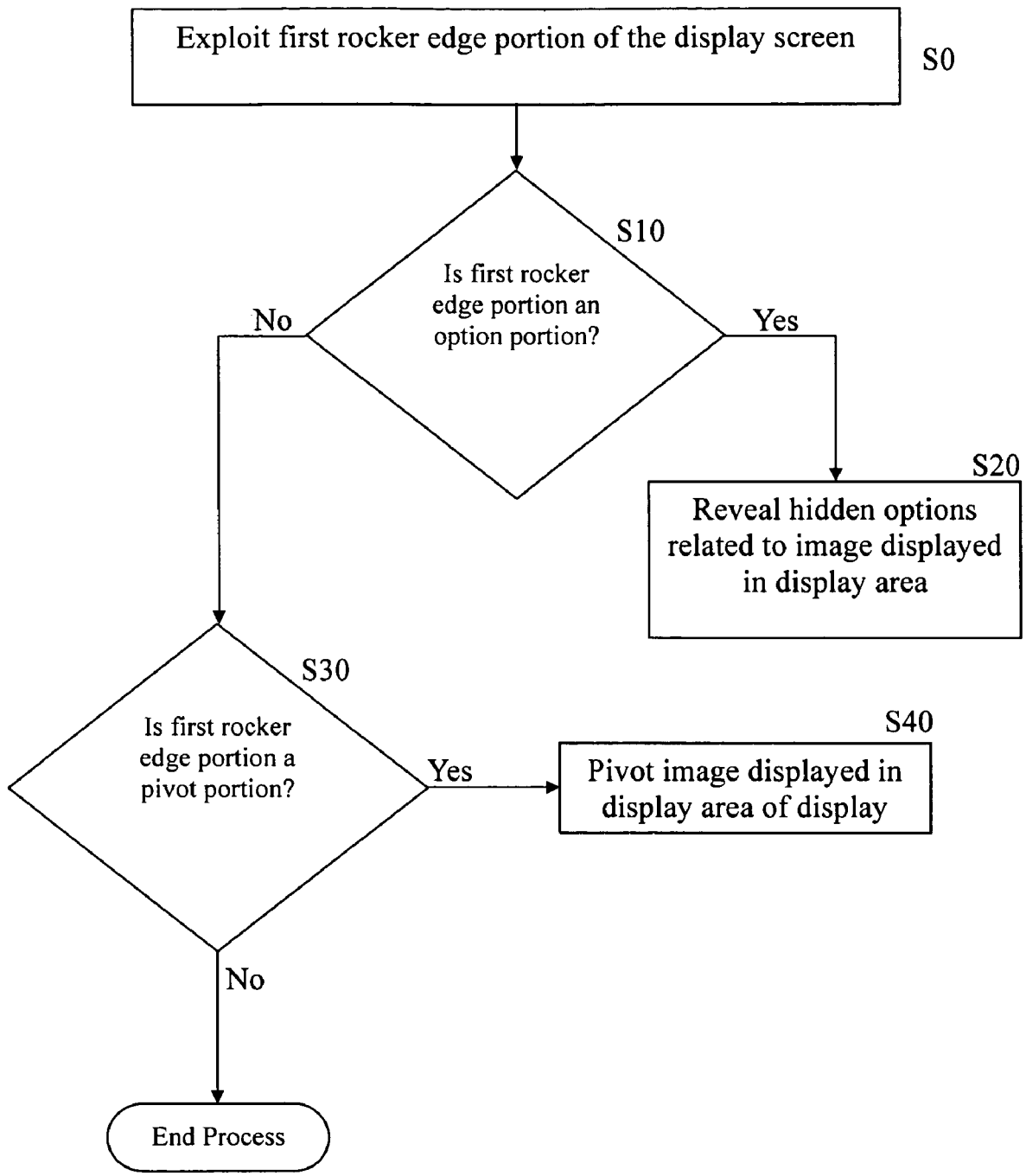
FIG. 3 is a flow chart illustrating steps included in an embodiment of the invention.

As illustrated in FIGS. 1-3, an embodiment of this invention includes using a 2-dimensional display screen 2 as a 3-dimensional multi-way rocker for pivoting an image 22 displayed on an image display area 20 of the 2-dimensional display screen 2 in a 3-dimensional manner. The 2-dimensional display screen 2 includes a plurality of (visible or invisible) predefined and adjustable edge portions (4, 6, 8, 10, 12, 14, 16 and 18). Edge portions 12, 14, 16 and 18 are corner portions and edge portions 4, 6, 8 and 10 are non-corner portions.

Each edge portion (4, 6, 8, 10, 12, 14, 16 and 18) can be designated as a respective rocker edge portion (e.g., edge portion 8 can be designated as a first rocker edge portion, etc.). Further, each respective rocker edge portion may be designated as at least one of a pivot portion and a panel portion.

The utilizing of the 2-dimensional display screen 2 as the 3-dimensional multi-way rocker includes exploiting the first rocker edge portion (e.g., edge portion 8) of the 2-dimensional display screen 2 (S0).

Next, a hidden panel (not illustrated) may be revealed. This hidden panel may be a panel related to the image 22 displayed on the 2-dimensional display screen 2 in response to the exploiting of the first rocker edge portion (e.g., edge portion 8). Once revealed, the hidden panel may include, for example, information and/or options related to the image displayed on the display screen. The hidden panel will only be revealed if the first rocker edge portion (e.g., edge portion 8) is designated as a panel portion (Yes at S10, and S20).

In addition, the utilizing may include, in response to the exploiting of the first rocker edge portion (e.g., edge portion 8), pivoting the image 22 displayed in the image display area 20 of the 2-dimensional display screen 2, such that the displayed image 22 is pivoted in a 3-dimensional manner based on a location of the first rocker edge portion (e.g., edge portion 8) with respect to the 2-dimensional display screen 2 and, optionally, based on a location of the image 22 on the 2-dimensional display screen 2. The pivoting may only occur if the first rocker edge portion (e.g., edge portion 8) is designated as a pivot portion (Yes at S30, and S40).

Additionally, in one embodiment, the image 22 may include the entire image displayed on the 2-dimensional display screen 2 (e.g., treating an image displayed on an entire display area of the 2-dimensional display screen 2 as the image 22 or treating the entire image display area 20 as the image 22). In another embodiment, the image 22 may only include an image that is displayed on a portion of the 2-dimensional display screen 2 (e.g., a portion of the 2-dimensional display screen 2 that is less than the entire display area).

When the pivoting of the image 22 displayed on the display screen 2 occurs, the image 22 can be pivoted such that (i) a new portion 23 of the image 22 or a new portion 23 associated with the image 22 appears and is displayed on a location of the display screen 2, (ii) the new portion 23 appears in a manner that provides an appearance that the new portion 23 pivots from a third dimension and pivots into the 2-dimensional plane formed by the display screen 2, and (iii) a previously visible portion of the image 22 pivots in relation to the appearance of the new portion 23.

Additionally, the previously visible portion of the image may begin to disappear from a display location of the display screen 2 in a manner that provides an appearance that the previously visible portion of the image 22 pivots from the 2-dimensional plane formed by the display screen 2 and into the third dimension (not illustrated).

In addition, when the image 22 displayed on the display screen 2 is pivoted, for example, an invisible axis 24 around which the image 22 displayed on the display screen 2 extends in a direction relative to the location of the first rocker edge portion (e.g., edge portion 8) such that the new portion 23 of the image 22 or associated with the image 22 is closer to the first rocker edge portion (e.g., edge portion 8) than the previously visible portion of the image 22 (that, for example pivots in relation to the appearance of the new portion 23 or begins to disappear from the display screen 2). Alternatively, the previously visible portion of the image 22 (that, for example pivots in relation to the appearance of the new portion 23 or begins to disappear from the display screen 2) may be closer to the first rocker edge portion (e.g., edge portion 8) than the new portion 23 that appears on the display screen 2, as if the pivoting occurs in an opposite direction than as described above.

As illustrated in FIG. 2, the previously visible portion of the image 22 is pivoting in relation to the appearance of the new portion 23 and the new portion 23 is appearing in the image display area 20 of the display screen 2. This feature provides the appearance that, since the first rocker edge portion (e.g., edge portion 8) is exploited the images 22 and 23 will rotate around the invisible axis 24 in a direction of the arrow 26 as if a left-most portion of the image 22 is pivoting at axis 24 and as if image 22 were being pressed to bring the new portion 23 into view from the third dimension.

Additionally, the location of the axis 24 may be adjusted in the direction of arrows 25 (FIG. 1), such that, as illustrated in FIG. 2, axis 24 is located near the left-most portion of the image display area 20. Further, depending upon the location of the axis 24, another new image (not illustrated) may appear in the left-most portion of the image display area 20 (e.g., if axis 24 were to be located in the center of the image display area 20, it may be appropriate for the other new image (not illustrated) to appear as if it were being pulled out of the 2-dimensional display screen 2).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

The invention claimed is:

1. A method of utilizing a 2-dimensional display screen as a 3-dimensional multi-way rocker for pivoting an image displayed on the display screen in a 3-dimensional manner, the display screen having a plurality of predefined and adjustable edge portions, each edge portion being designated as a respective rocker edge portion, and each respective rocker edge portion being designated as one of a pivot portion and a panel portion, the method of utilizing the 2-dimensional display screen as the 3-dimensional multi-way rocker comprising:

exploiting a first rocker edge portion of the display screen;

revealing a hidden panel that includes only hidden options related to the image displayed on the display screen in response to said exploiting of the first rocker edge portion, said revealing only occurring when the first rocker edge portion is designated as a panel portion; and pivoting the image displayed on the display screen in response to said exploiting of the first rocker edge portion, such that the displayed image is pivoted in a 3-dimensional manner based on a location of the first rocker edge portion with respect to the display screen, said pivoting occurring only when the first rocker edge portion is designated as a pivot portion, wherein, when said pivoting of the image displayed on the display screen occurs, the displayed image is pivoted such that (i) a new portion of the displayed image or a new portion associated with the displayed image appears, (ii) the new portion of the displayed image or associated with the displayed image appears in a manner that provides an appearance that the new portion pivots from a third dimension and into a 2-dimensional plane formed by the display screen, and (iii) a previously visible portion of the image pivots in relation to the appearance of the new portion of the displayed image or associated with the displayed image, and wherein, when the image displayed on the display screen is pivoted, an axis, around which the image displayed on the display screen rotates, extends in a direction relative to the location of the first rocker edge portion such that the new portion of the displayed image or associated with the displayed image is closer to the first rocker edge portion than the previously visible portion of the image.

* * * * *